United States Patent [19]

Biggs et al.

[11] Patent Number: 5,019,814

[45] Date of Patent: May 28, 1991

[54] WIRELESS DATA COUPLING SYSTEM AND METHOD

[75] Inventors: David H. Biggs, Gardnerville, Nev.; John K. Little, Tucson, Ariz.; Philip C. Hanifan, Gardnerville, Nev.

[73] Assignee: Bently Nevada Corp., Minden, Nev.

[21] Appl. No.: 187,197

[22] Filed: Apr. 28, 1988

Related U.S. Application Data

[63] Continuation-in-part of Ser. No. 50,715, May 13, 1987, abandoned.

[51] Int. Cl.⁵ .................... G08C 19/16; G02B 27/00
[52] U.S. Cl. .................. 340/870.290; 340/870.28; 455/606; 455/607; 455/602; 250/551
[58] Field of Search ............. 340/870.29, 870.28; 33/1 PT; 250/231 SE, 551; 324/175; 73/862.33; 455/602, 603, 605–607

[56] References Cited

U.S. PATENT DOCUMENTS

| | | | |
|---|---|---|---|
| 3,619,612 | 11/1971 | Belke | 340/820.29 X |
| 4,109,998 | 8/1978 | Iverson | 340/870.29 |
| 4,310,767 | 1/1982 | Peacock | 250/551 |
| 4,605,925 | 8/1986 | Mark | 340/870.29 |
| 4,646,086 | 2/1987 | Helzel | 340/870.29 |

Primary Examiner—Donald J. Yusko
Assistant Examiner—Michael Horabik
Attorney, Agent, or Firm—Flehr, Hohbach, Test, Albritton & Herbert

[57] ABSTRACT

A wireless data coupling system for transmitting data such as torque from a rotating shaft to a stationary receiver includes at least one photocell on the shaft along with a corresponding stationary light source for illuminating the photocells. This powers the rotating components. From a data standpoint an analog signal from a strain gauge is converted to a digital signal which is transmitted bit by bit by a pair of light emitting diodes one of which acts as a data sync. The stationary receiver contains columns of phototransistors to receive both the data and data sync pulses. Initiation of the transmission of data is started by a start pulse which occurs first in time and thereafter send pulses from the stationary system actuate the data and data sync pulses from the rotating system.

12 Claims, 10 Drawing Sheets

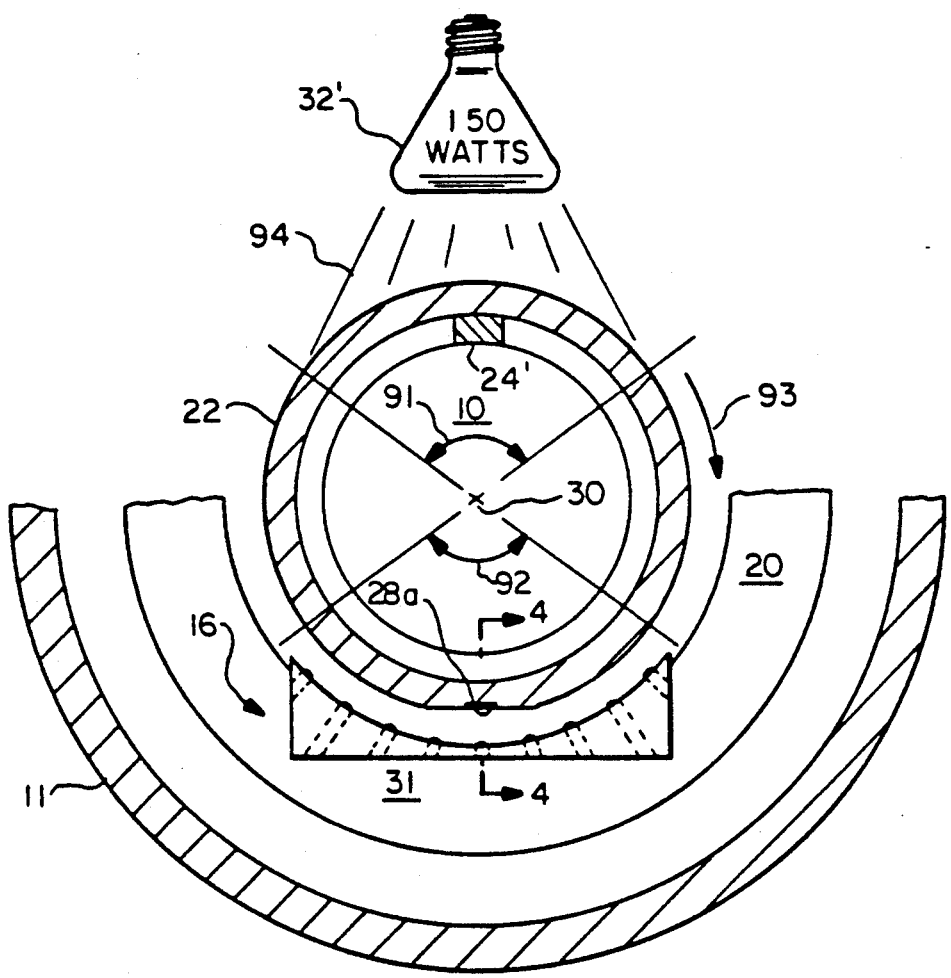
FIG.—3A

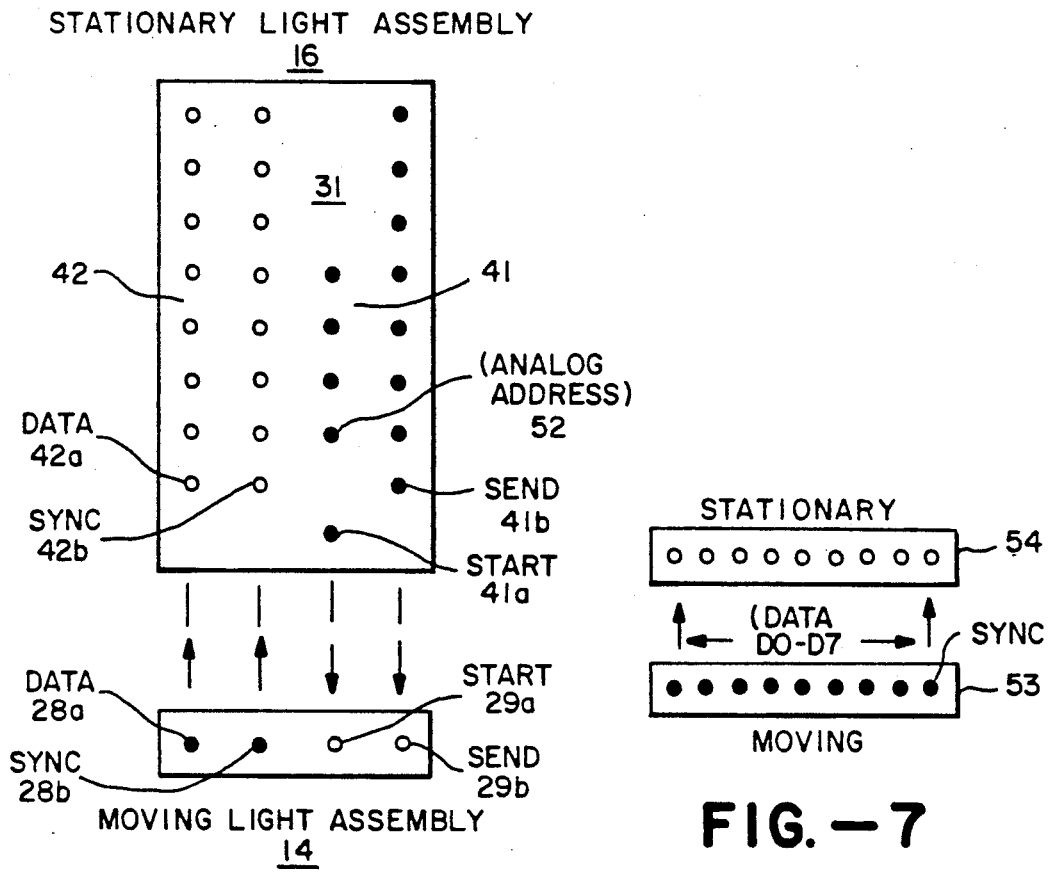
FIG.-6
FIG.-7
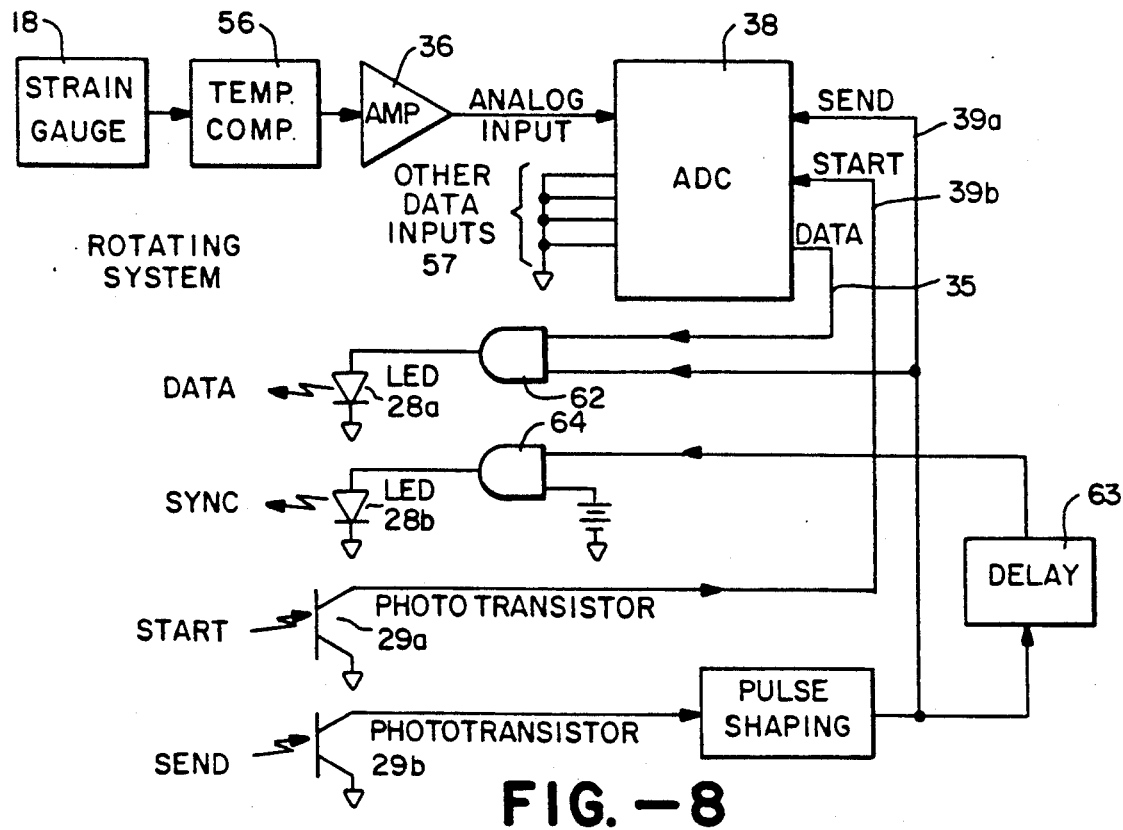
FIG.-8

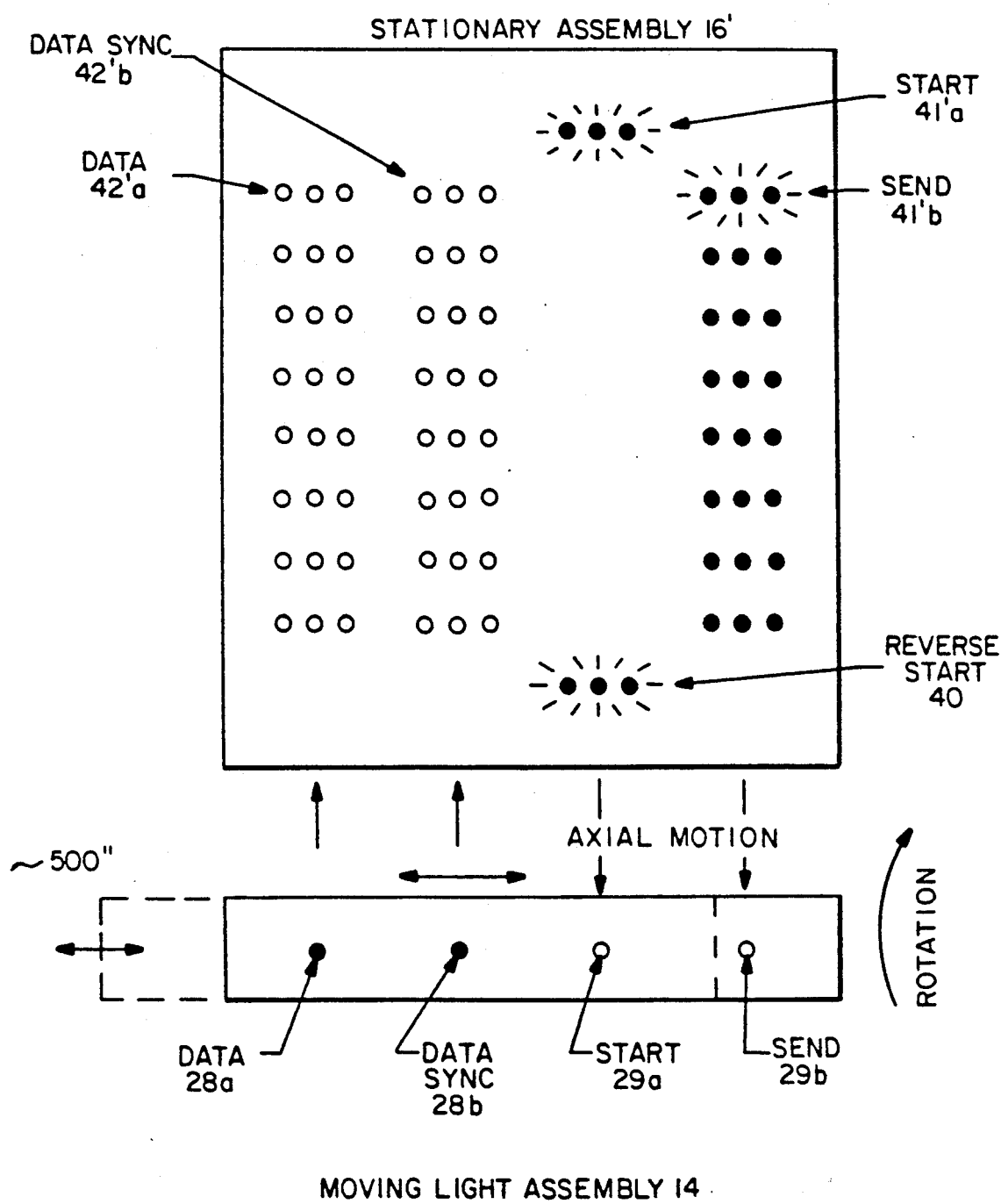
FIG.—6A

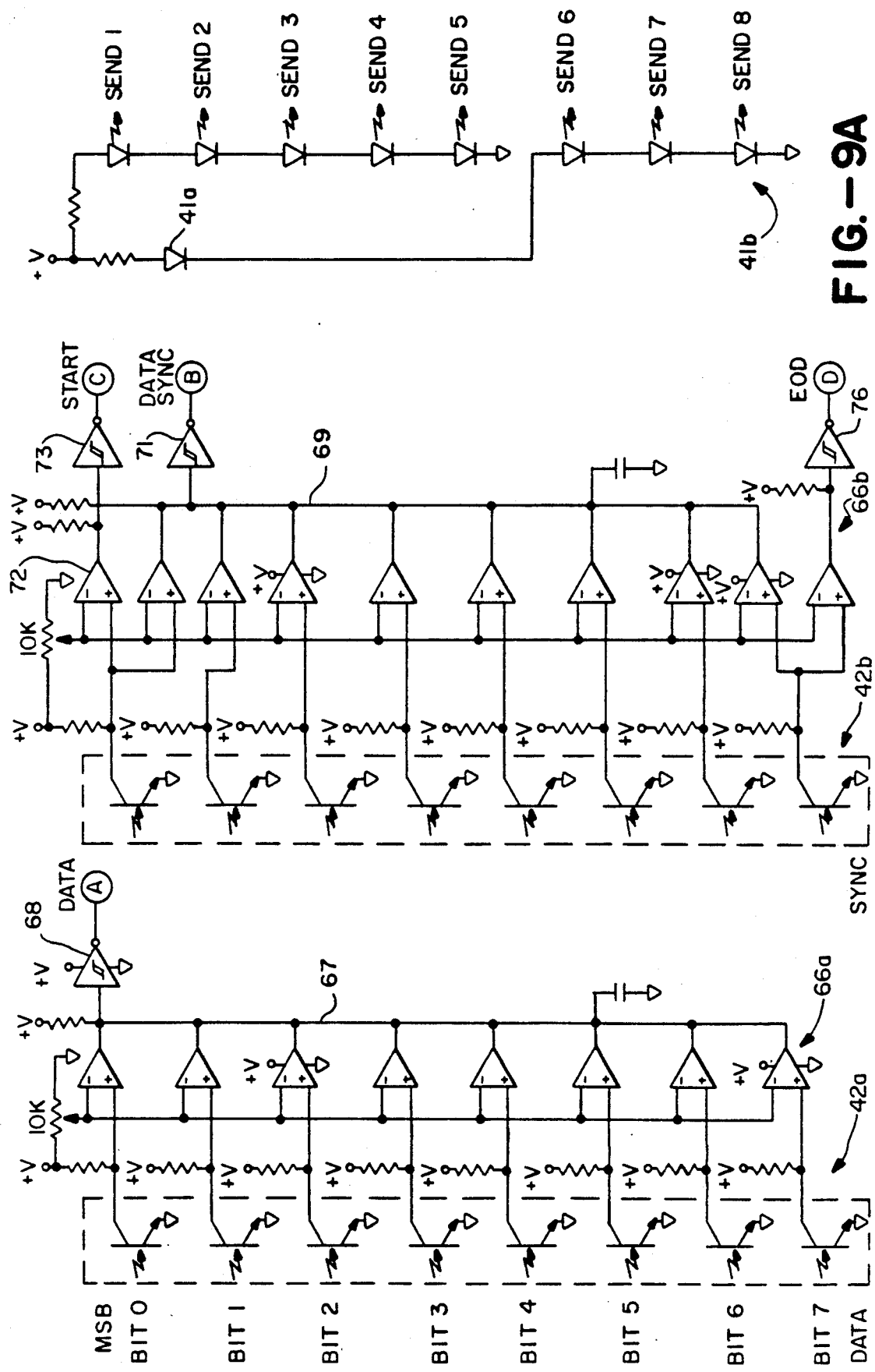

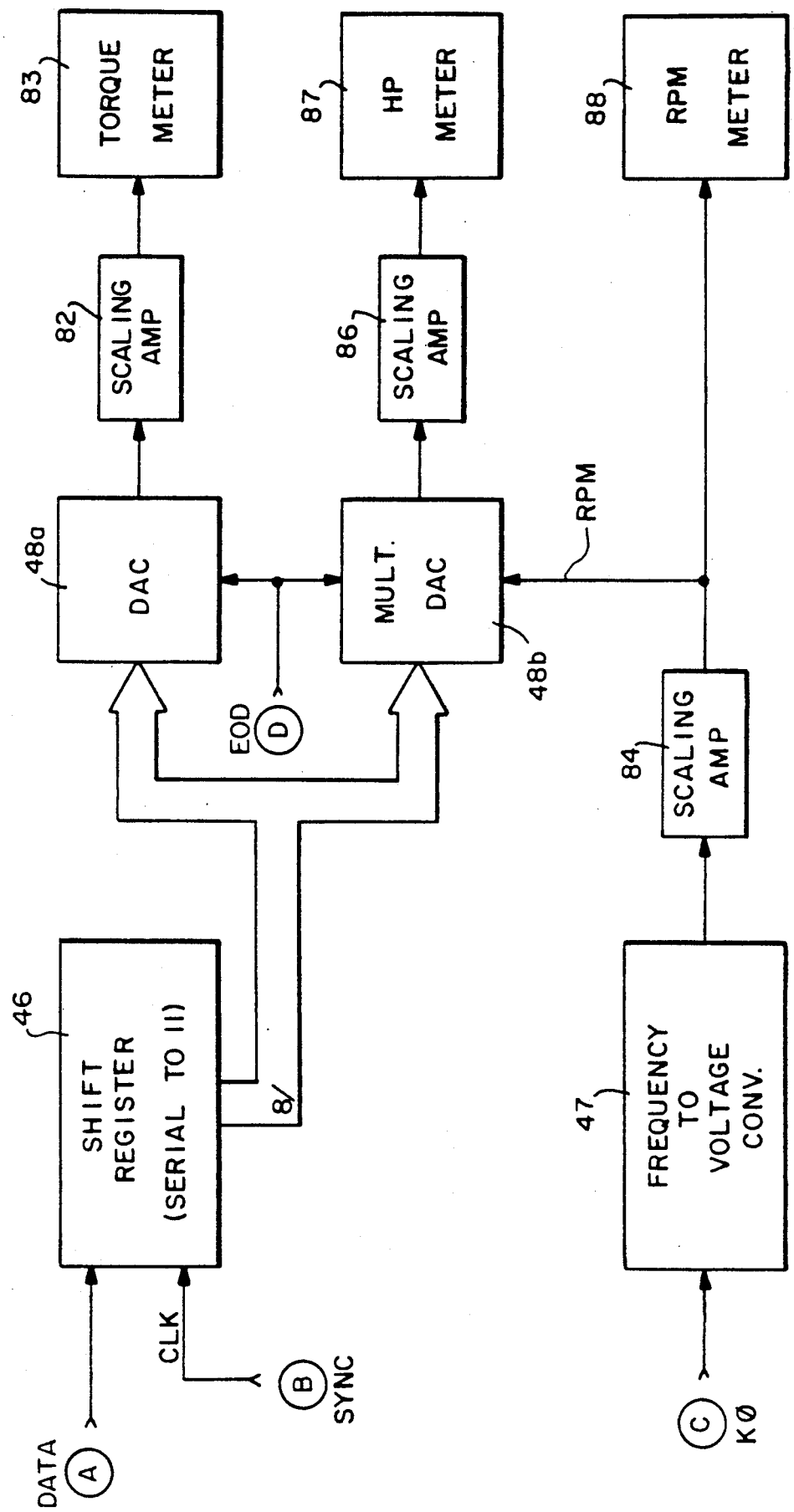
FIG.—9B

WIRELESS DATA COUPLING SYSTEM AND METHOD

This is a continuation-in-part of patent application, Ser. No. 050,715 filed May 13, 1987.

The present invention is directed to a wireless data coupling system and method therefor and more particularly to a system where the torque of a rotating shaft is measured.

BACKGROUND OF THE INVENTION

Efficiency monitoring for the user of large rotating machines, such as motors or turbines has become increasingly important because of the increased cost of energy. One technique for monitoring efficiency is a torque sensor which, when coupled with revolutions per minute (RPM), measures transferred energy from the prime mover to a load such as a compressor or pump.

Since the torque measuring instrumentation in the form of, for example, a strain gauge on the shaft is on a rotating member it is necessary to provide some type of telemetering such as radio, light or mechanical transfer techniques such as slip rings, or electrical induction techniques. These are all known and the major problem in this area is to provide, in view of the very stringent ambient conditions, a reliable telemetry system which is low cost, durable and error-free in transmitting data. It is also desirable to have a system which is flexible in that many different types of data sources (such as strain gauge and semiconductor devices) may be used and where the system can accommodate all of these different data sources at the same time.

OBJECT AND SUMMARY OF INVENTION

It is therefore a general object of the present invention to provide a wireless data coupling system.

In accordance with the above object there is provided a wireless data coupling system for transmitting data from a rotating shaft to a stationary receiver where a parameter of the shaft is being measured. The system comprises at least one photocell on the circumference of the shaft receiving light energy for powering electric components mounted on the shaft. Means are mounted on the shaft and powered by the photocell for converting a measured analog signal parameter to a signal having a plurality of binary digits and transmitting the digits of the signal to the stationary receiver.

BRIEF DESCRIPTION OF THE DRAWINGS

FIG. 3A is an alternative embodiment of FIG. 3.

FIG. 6 is a simplified plan view of the specific telemetry of the invention.

FIG. 6A is an alternative embodiment of FIG. 6.

FIG. 7 is a plan view of alternate telemetry of the invention.

FIG. 8 is a more detailed electrical schematic of the rotating portion of the system of the present invention.

FIG. 9A is a more detailed schematic of a portion of the fixed or stationary electronics of the present invention.

FIG. 9B is a more detailed schematic of another portion of the fixed electronics embodying the present invention.

DETAILED DESCRIPTION OF PREFERRED EMBODIMENTS

Figure 1:
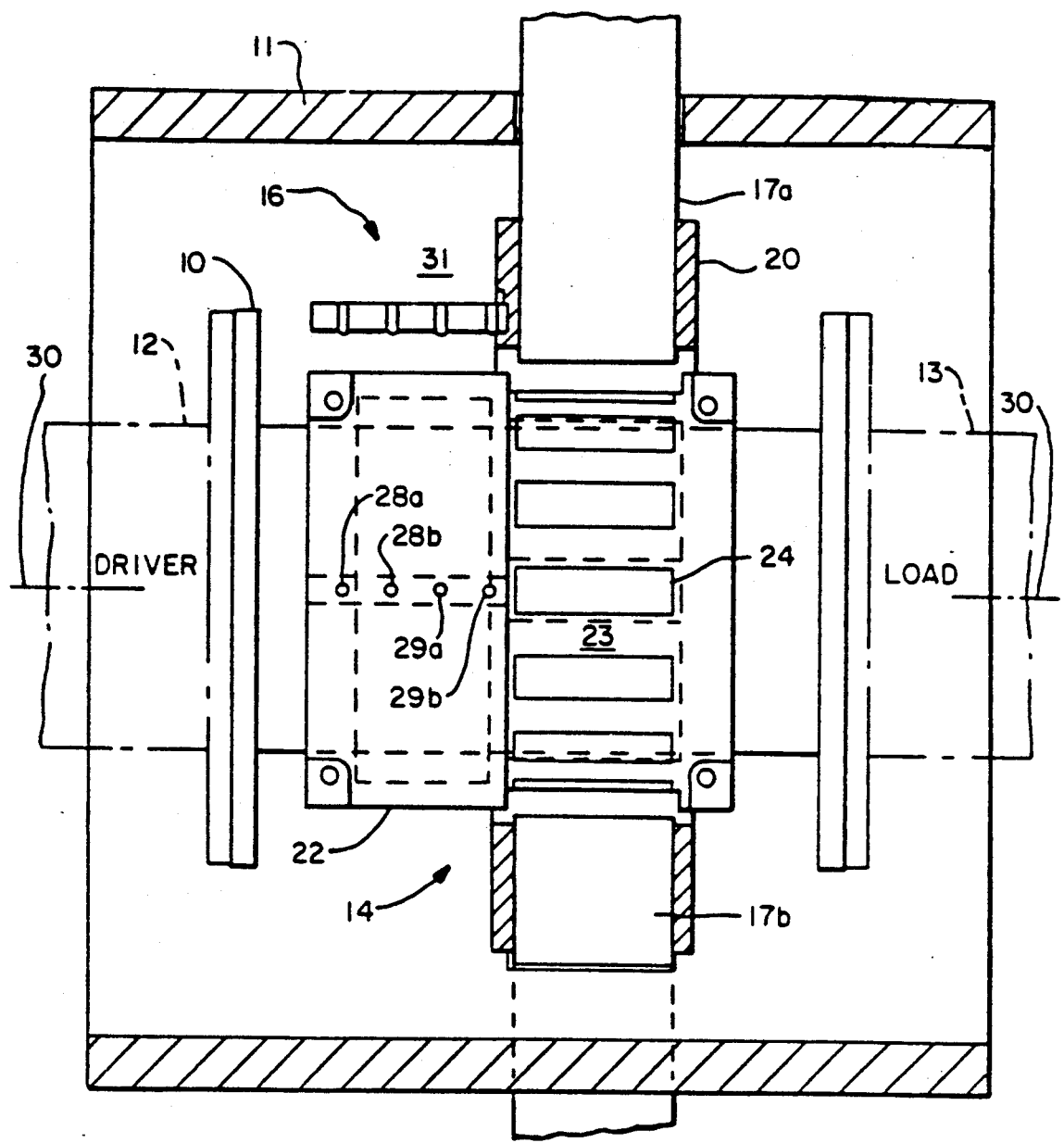
FIG. 1 is a simplified cross-sectional view of a wireless data coupling system embodying the present invention, showing how it is connected to a coupling or shaft between a driver and load.

Referring now to FIG. 1, the rotating components 14 of the wireless coupling system are mounted on a coupling 10 by a cylindrical collar 22 which surrounds the coupling. At the left end of coupling 10 a driver 12 is indicated and at the right end a load 13. Thus, in actual use, for example, the driver 12 may be the shaft of a turbine and load 13 the shaft of a generator. The user of the system provides the coupling 10 to the manufacturer of the wireless system who installs the rotating electronics 14 in the form of an aluminum collar 22 on shaft 10 along with the stationary system 16 and the three light pipes or guides 17a, 17b, 17c which are installed on the protective cylindrical casing 11. These are then returned to the user and, after calibration and balancing, installed on the actual rotating machinery.

Figure 4:
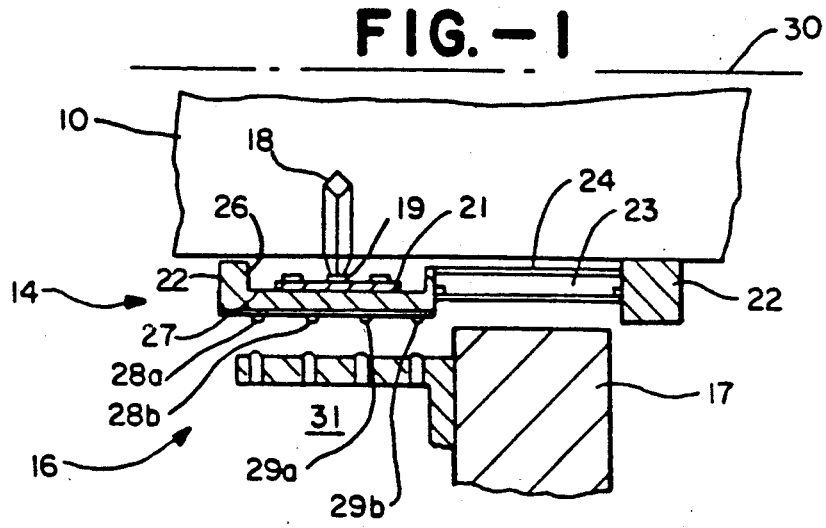
FIG. 4 is a cross-sectional view taken along line 4—4 of FIG. 3 which is somewhat representational and simplified.

The rotating system 14, as also shown in FIG. 4, includes means for measuring a parameter of the shaft such as torque. In this specific case a strain gauge 18 is shown as bonded to a portion of the coupling 10. Strain gauge 18 is connected to the flexible printed circuit board 21 inside the rotating system 14. The components 19 are mounted on the side of circuit board 21 facing shaft 10. The aluminum collar of the rotating electronics is specifically shown at 22. The left portion of the collar includes the electronics portion of the system and the right portion at 23 carries a plurality of photocells 24 (see FIG. 1) which are spaced continuously around the circumference of the shaft of the coupling 10. These photocells are for the purpose of accepting the light energy through the light pipes 17a–17c and thus powering the rotating electronics.

Collar 22 retains the flexible printed circuit board 21 in a U-shaped slot 26 and on its bite portion 27 has mounted on it the printed circuit 21. Bite portion 27 is coaxial with axis 30 of the coupling. With this orientation it is obvious that the centrifugal forces appearing during rotation of the shaft will bias both the printed circuit board and the components 19 mounted thereon against the bite portion 27. Thus, this provides a very effective mounting for the rotating electronics. Components 19 could be either discrete components or integrated into the circuit itself.

The rotating system for communicating with the stationary receiver 16 has a pair of light emitting diodes 28a and 28b and a pair of phototransistors 29a and 29b mounted parallel to the axis 30 of the shaft and on the external portion of the collar 22. Associated phototransistors and light emitting diodes are illustrated generally at 31 on the stationary receiver 16 which communicate with the rotating electronics. FIG. 6 shows the arrangement in greater detail and will be discussed below.

Figure 2:
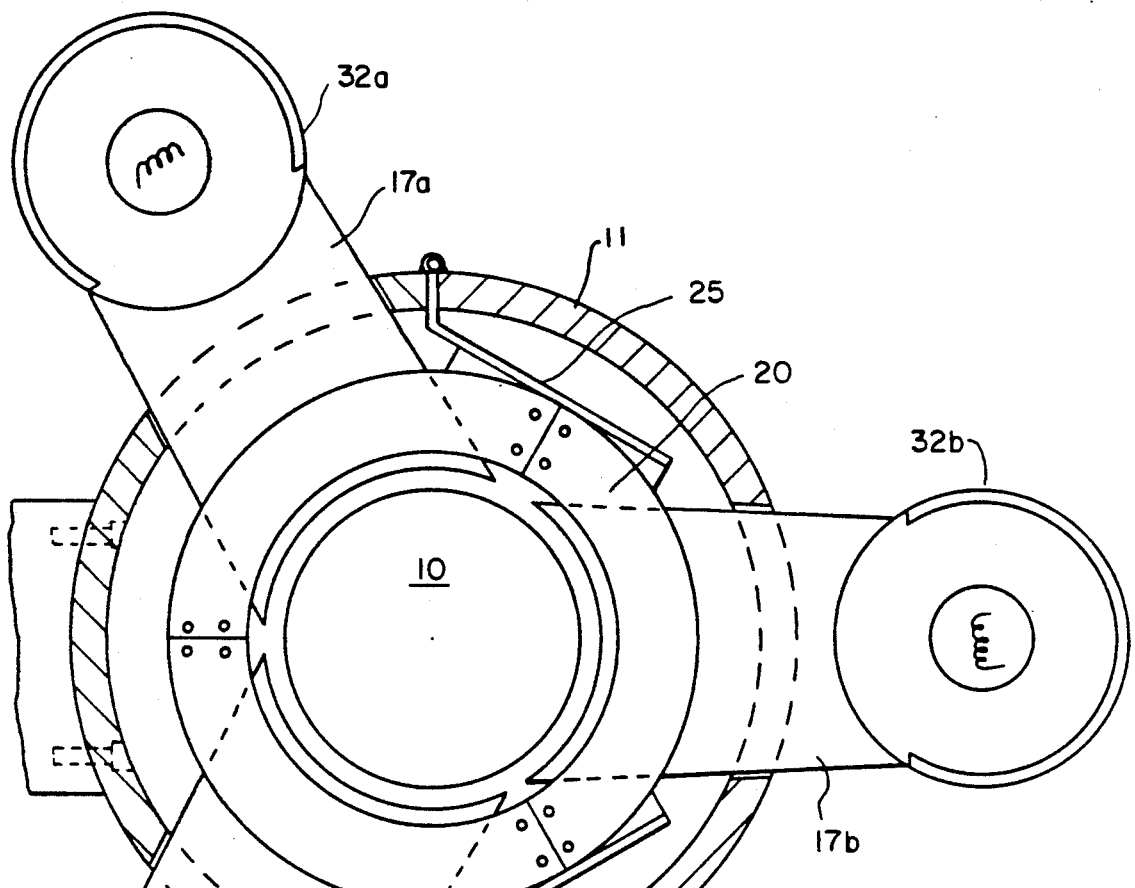
FIG. 2 is a cross-sectional view of a portion of FIG. 1 illustrating its light pipes.

FIG. 2 illustrates the light guides or light pipes 17a–17c more completely from a side view. They are in the form of substantially rectangular blocks (with non-parallel radial sides) of plexiglass material, for example, which have a semicircular cutout at both ends. They are, of course, provided with mounting means including the sectors 20 which sandwich the pipes and are bracketed by arms 25 to the cylindrical cover 11. At the ends in close proximity to the photocells on the shaft 10 each of the three light pipes covers approximately a 120-degree sector of the shaft. Thus, all photocells are simultaneously illuminated to provide for maximum transfer of energy. At the opposite ends are three explosion-proof light enclosures 32a–32c which include, as indicated, 100-watt light bulbs.

Figure 3:
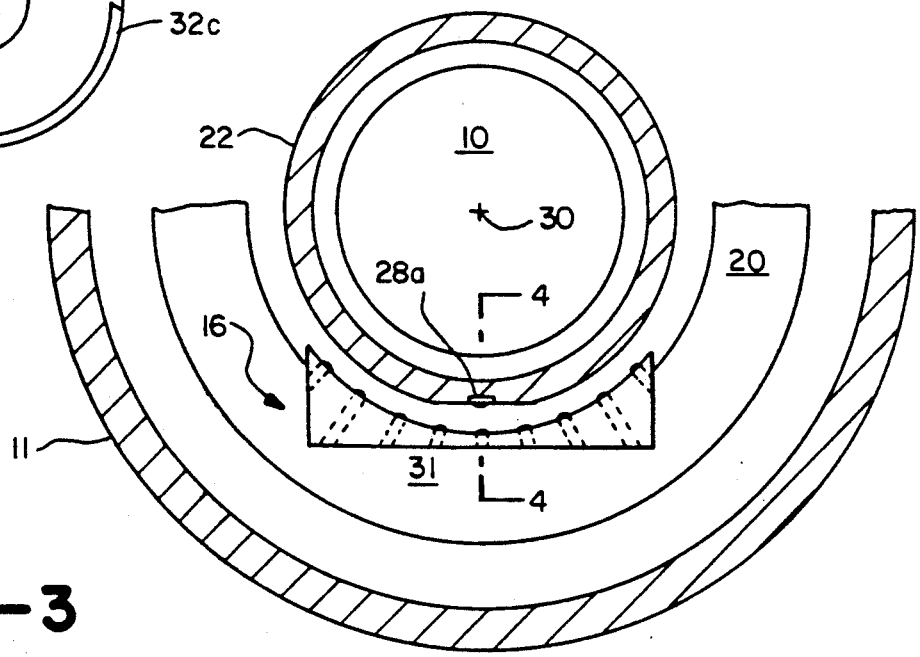
FIG. 3 is a partial cross-sectional view of another portion of FIG. 1, illustrating a data coupling

FIG. 3 indicates in greater detail the mounting of the fixed system 16 to the sectors 20 which are affixed to the cylindrical cover 11 showing a representative plurality of light sources and light receivers 31 and how they interface with the single line of rotating receivers and sources (with source 28a being specifically represented) on the rotating electronics. It is obvious that the sources and receivers on the stationary system 31 are in an arcuate curved shape to match the curvature of the shaft and rotating electronics collar 22.

Figure 5:
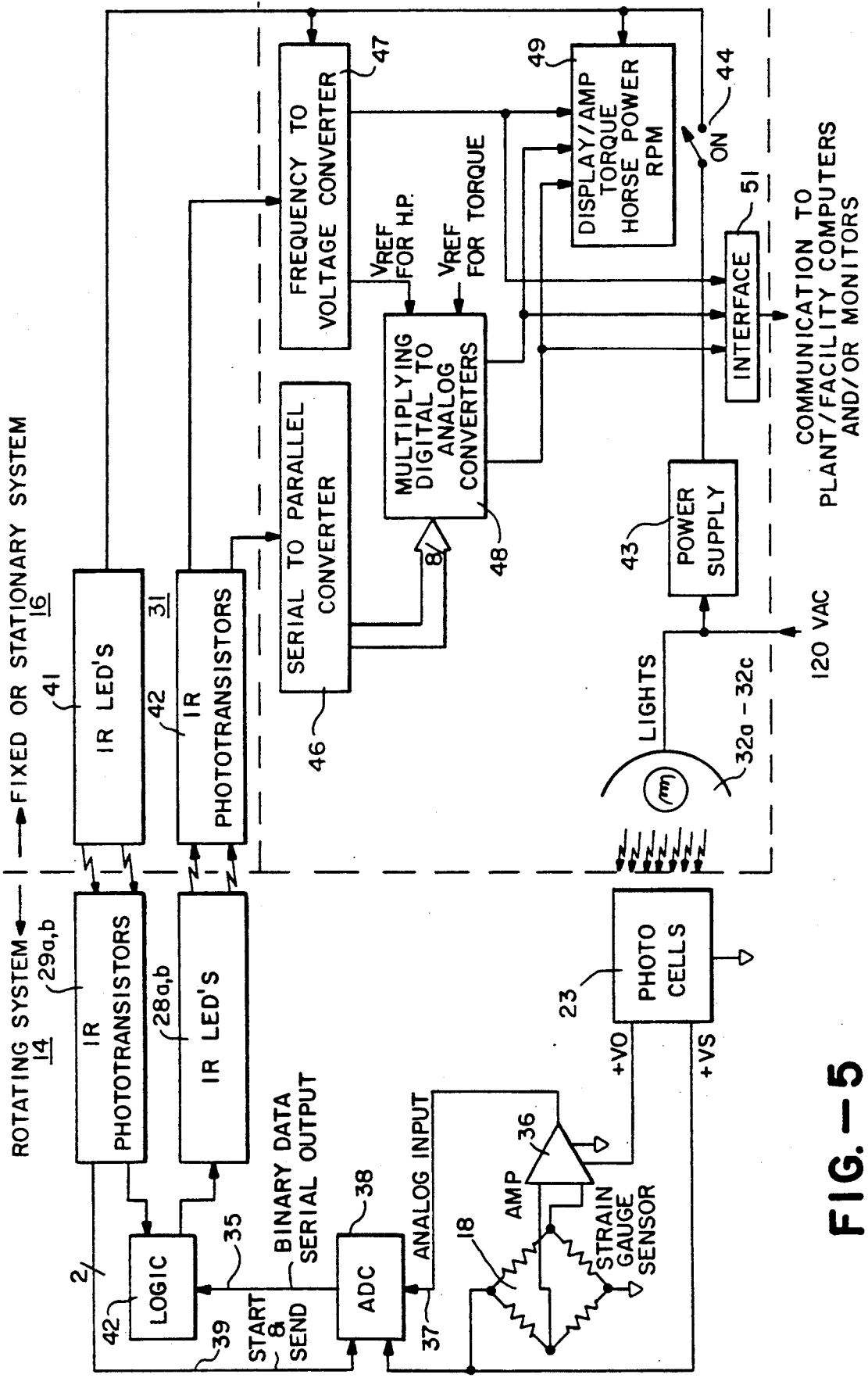
FIG. 5 block diagram embodying the present invention.

The interconnection between the rotating system 14 and the stationary system 16 is illustrated in block diagram format in FIG. 5. First, referring to the rotating system, a strain gauge 18 produces an analog signal amplified by instrumentation amplifier 36 to provide an analog input 37 to an analog to digital converter 38. This converter is responsive to start and send signals on its input line 39 to provide a binary data serial output on line 35 which, via logic unit 42 drives infrared light emitting diodes 28a and 28b. Start and send signals on line 39 are provided by the phototransistors 29a and 29b.

To power all the foregoing instrumentation, the photocells 23 are continuously illuminated by the light sources 32a–32c which of course are stationary or fixed.

In the stationary system 16 the telemetry is completed with the transmitting light emitting diodes 41 and the receiving infrared phototransistors 42 which form part of the data telemetry system 31 as previously illustrated.

Transmitting light emitting diodes 41 are powered continuously via the power supply 43 and the switch 44. Data is received by the phototransistors 42 and coupled to serial to parallel converter 46 and frequency to voltage converter 47. A series of data manipulations is accomplished by the multiplying digital-to-analog converters 48. A display of torque horsepower and revolutions per minute (RPM) at 49 is provided. All of these outputs are also coupled to an interface unit 51 for transmission to other monitors or a plant/facility computer.

FIG. 6 fully illustrates the communication between the stationary system or light assembly 16 and the moving light assembly 14. The infrared light emitting diodes are shown as solid dots and the phototransistors as small circles.

With respect to moving light assembly 14, the light emitting diodes 28a and 28b have already been discussed (as far as physical location) and in addition the phototransistors 29a and 29b.

The stationary light assembly 31 is of an arcuate shape (as best illustrated in FIG. 3) having a radius which is perpendicular to the axis 30 of the rotating shaft. The stationary panel 31 on the left portion includes two arcuate columns of phototransistors 42a and 42b; the one on the furthest left, 42a, is for reception of data and the next column 42b is for data sync. On the right hand portion of the panel are light emitting diodes 41 which includes a start emitting diode 41a and an arcuate sequence of send diodes 41b.

Thus, from a general standpoint, when the data light emitting diode 28a of the rotating source is communicating with the stationary system, as the shaft rotates the LED 28a opposite each one of the sequence of the data phototransistors 42a, a bit of the data is transmitted. Data sync LED 28b provides for the clocking or synchronizing of the data; in other words, this is a technique of telling the stationary electronics that binary data, either 1 or 0, are present. Analog address LEDs 52 are illustrated but are an option where more than one data source is utilized on the rotating shaft.

With respect to the data phototransistors 42 there is one phototransistor for each binary digit or bit of data forming an 8-bit byte. And, of course, there is a separate sync phototransistor 42b for each data phototransistor. Lastly, there is a corresponding send LED 41b for each data phototransistor bit. All of the foregoing provides for effective "handshaking" to provide reliable transmission of data from the rotating system to the stationary system. In the embodiment just described these data are, of course, translated in a serial mode because of the use of a single data transmitting LED 28a which sequentially in time sends a signal for each bit of the stored data to be received.

Accuracy of data transfer and immunity to stray light is provided by matching angles (in this case 20°) for both the LEDs and phototransistors as illustrated in FIG. 6.

Alternatively, as illustrated in FIG. 7, data could be transmitted in parallel with the moving light assembly 53 having 8 light emitting diodes with designated bits D0–D7 and the stationary assembly 54 having corresponding photo transistors. A synchronizing phototransistor and LED are also used. Such an alternative arrangement might be suitable in some circumstances.

FIG. 8 shows in more detailed format the electronics of the rotating system. The strain gauge 18 produces an analog signal which is compensated by temperature compensation unit 56 and amplified by the amplifier 36. This diagram is somewhat more detailed than that illustrated in FIG. 5. The analog output of amplifier 36 is coupled to analog to digital converter 38 as which has as other inputs the send and start pulses on line 39a and 39b and as an output the serial data on line 35.

Other data inputs 57 are indicated which, for example, might be pressure and bending forces of the shaft or temperature, but these are optional. And if these other data inputs are utilized an analog address 52 (see FIG. 6) would have to be utilized also. But in the present embodiment they are grounded out. ADC unit 38 is illustrated more fully in FIG. 10 and includes the analog multiplexer 58 which receives the signal from the strain gauge 18 (the other inputs would of course be grounded out) and has the optional address input 57, and provides as analog signal to an analog to digital converter 59. Upon a start conversion input on its line 39b the converter 59 converts the analog input to digital format and thus on its outputs, designated D0–D7, causes a shift register 61 to store an 8-bit byte or string of binary digits. Then this data is serially shifted out on line 35 by action of the S clock which is also the send input 39a.

FIG. 8 also illustrates the light signal sending LEDs 28a, 28b and receiving phototransistors 29a and 29b. The data LED 28a is powered via AND gate 62 by coincidence of the data output 41 and a send pulse on line 39a. This is generated by the phototransistor 29b. The output of send phototransistor 29b, after pulse shaping, is also delayed by unit 63 to provide the AND gate 64 a data sync pulse from LED 28b. This delay ensures that data are present when a data sync pulse goes high. Finally, the start pulse is received on phototransistor 29a which is coupled on line 39b to the ADC unit 38.

Figure 11:
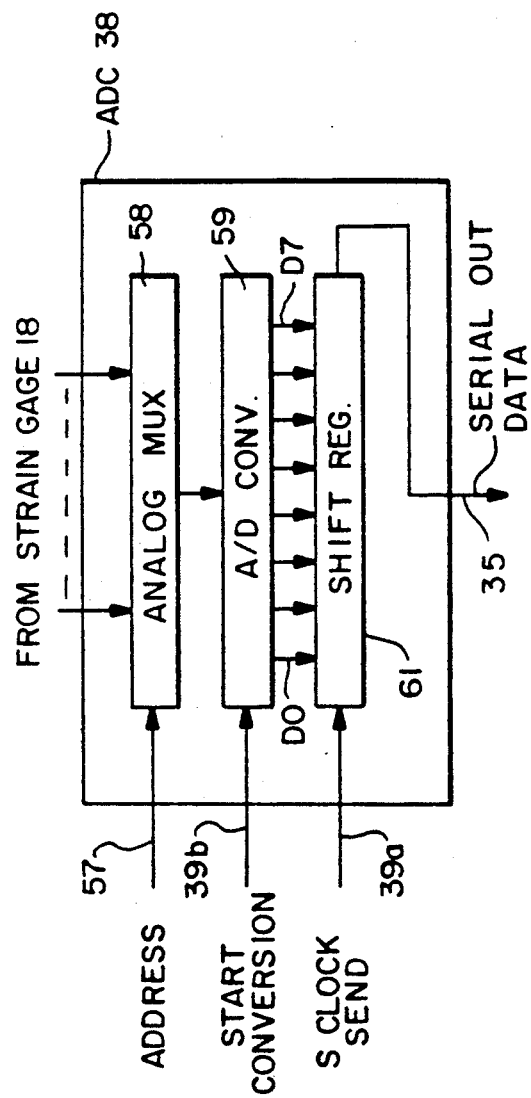
FIGS. 11A–11E are timing diagrams useful in understanding the operation of the invention.

Briefly referring to FIG. 11, the start pulse in time occurs initially in FIG. 11A causing an analog to digital conversion on its falling edge. FIG. 11B represents the send pulses on line 39a; FIG. 11C the data output of line 35 and FIG. 11D the sync pulses. The delay caused by unit 63 between the send of FIG. 11B and the sync is indicated in FIG. 11D. Optional address bits are illustrated in FIG. 11E.

FIGS. 9A and 9B illustrate in more detail the stationary system 16 as more broadly shown in FIG. 5. Referring to FIG. 9A, the bits of data designated 0-7 are received by the corresponding phototransistors 42a and the same is true of the sync information received by phototransistors 42b. Each of the phototransistors is respectively associated with a comparator 66a and 66b. In the case of the data phototransistors 42a all the comparators are joined together on a common line 67 which is squared by amplifier 68 (in reality a Schmidtt trigger) to produce a data output designed "A".

Similarly, for the data sync outputs of phototransistors 42b a common line 68 is coupled to all of the comparators 66b associated with each 30 phototransistor 42b and via Schmidtt trigger 71 a data sync output designated "B" is produced. However there are two additional comparators; one comparator 72 which is associated with the first data sync pulse to be received (since it is the first in line physically in the direction of rotation as illustrated in FIG. 6) provides via the trigger 73 an output designated "C" which is an indication of revolutions per minute of the shaft 10. This is also designated Kd. Similarly with respect to the comparator 74 it is coupled to the last send phototransistor in time. This provides via the trigger 76 and end of data (EOD) indication on the line designated "D".

From a light signal transmission standpoint, a light emitting diode 41a provides a start indication (see FIG. 6) and the group of 8 series connected light emitting diodes 41b provides send pulses. These, as is obvious from inspection of FIG. 5 when actuated by the switch 44 continuously provide an output. However, in view of the arcuate spacing of the send LEDs the effect is to have a sequence of send signals in time.

FIG. 9B indicates the remaining processing of the received signals which includes the data and sync signals designated "A" and "B". These are coupled into the shift register 46 (as also illustrated in FIG. 5) or serial to parallel converter which in combination with the data sync pulse which acts as a clocking pulse, stores in the shift register 8 bits of data. These 8 bits are then shifted out on the parallel output bus 81 which is coupled to both a digital to analog converter 48a and a multiplying digital to analog converter 48b.

With respect to converter 48a, the data which represents raw torque is converted to an analog form, scaled by a scaling amplifier 82 and then drives a standard torque meter 83. The torque meter 83 might convert the analog signal to a digital readout. At the same time, the multiplying digital to analog converter 48b has as an input the revolutions per minute from input "C" which is converted to a voltage by a frequency to voltage converter 47 and then is processed by the scaling amplifier 84. The multiplication of RPM and torque yield horsepower by use of the scaling amplifier 86 which drives a standard horsepower meter 87. Lastly, the scaling amplifier 84 from the input "C" drives the revolution per minute meter 88. As also shown in FIG. 5, the various meter drives can also be communicated to other facility computers and other monitors.

The overall operation of the method and system of the present invention can be best understood by reference to FIG. 11. For each rotation of the shaft a start signal from light emitting diode 41a, as illustrated in FIG. 6, occurs initially because of the physical radial circumferential location of the start LED ahead of the send LEDs 41b. The start signal, as illustrated in FIG. 10 (line 39b) and FIG. 11A, causes the rotating source and its strain gauge 18 to store in binary digital format in the shift register 61 (FIG. 10) the data to be transmitted.

Figure 9C:
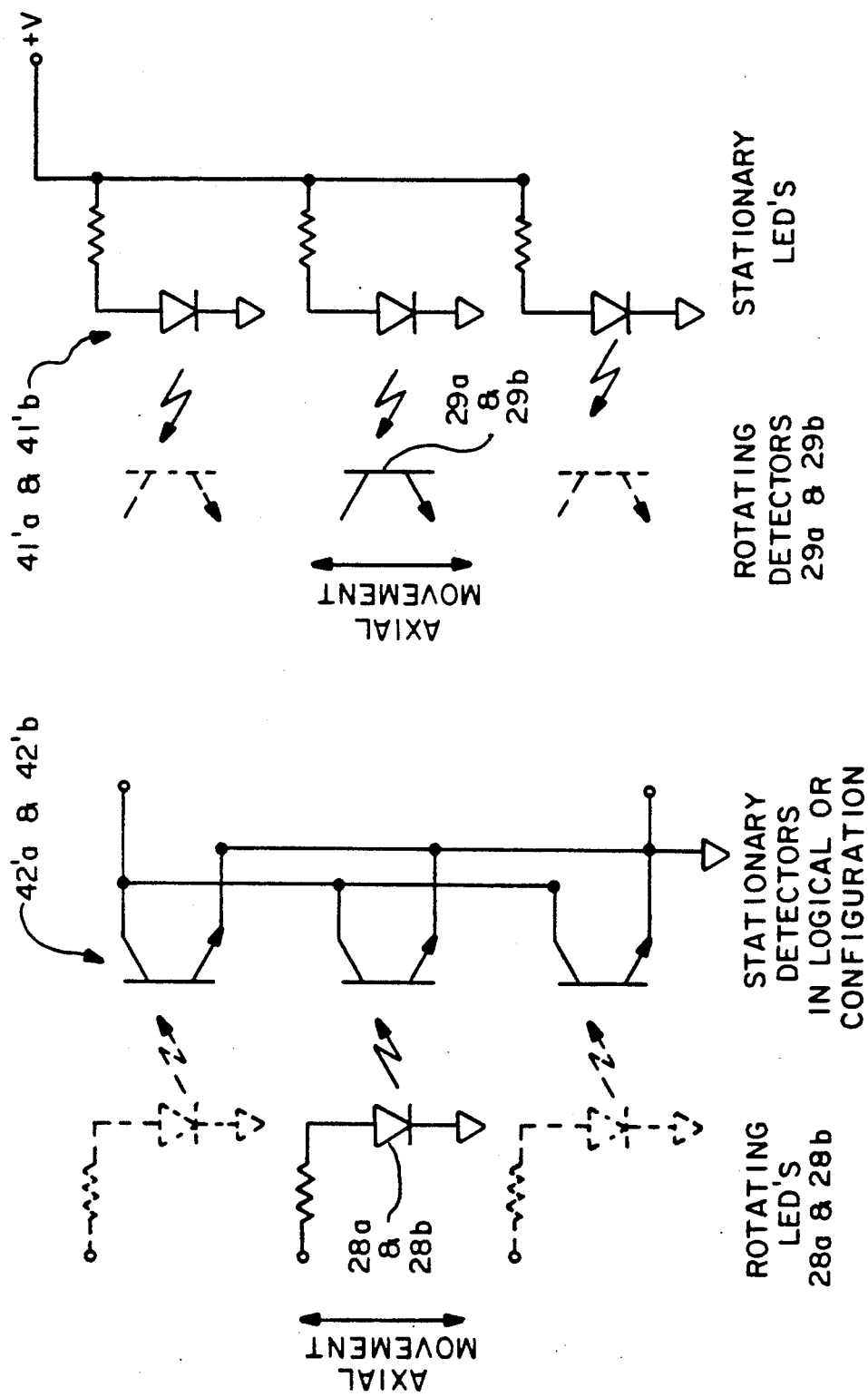
FIG. 9C is an alternative embodiment of FIG. 9A.
Figure 10:
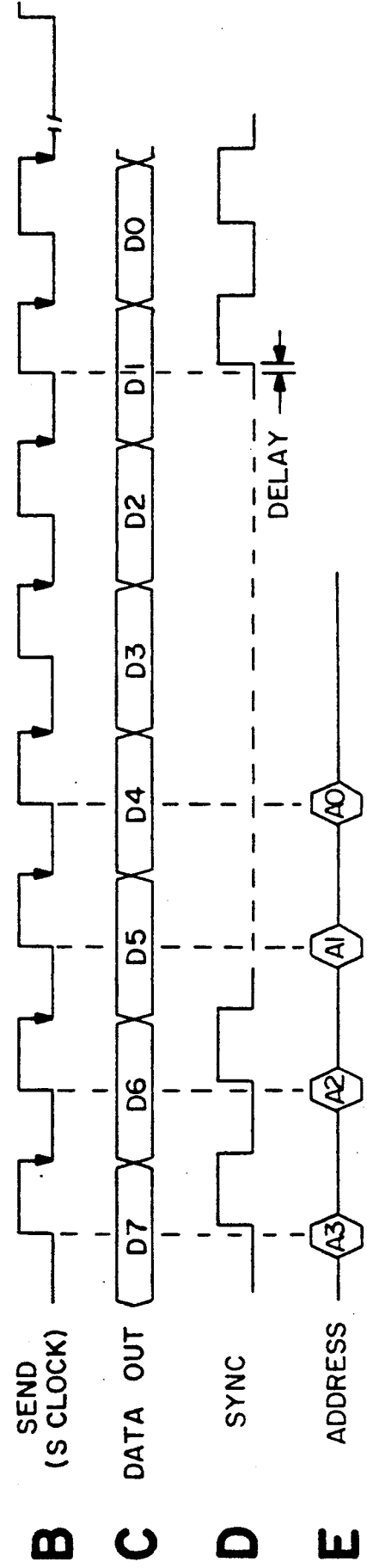
FIG. 10 is a more detailed schematic of a component of FIG. 8.

The send signals (FIG. 11B) from the light emitting diodes 41b are received by the send phototransistor 29b of the rotating source and this clocks the shift register 61 as illustrated in FIG. 10 to provide a sequence of binary data signals (FIG. 11C) be shifted out on line 35 which drive the data LED 28a (FIG. 6). At the same time via delay unit 63 (FIG. 8) sync pulses are sent as illustrated in FIG. 11D with a slight delay so that the data signal will be fully present. These sync pulses as illustrated in FIG. 9B are used to clock shift register 46 with the stream of incoming data. This data then processed, as explained in conjunction with FIG. 9B along with the RPM indication which occurs from the first of the sync pulses to provide, in addition to torque, horsepower and RPM.

Where either high speed or light weight is desired, the photocell system 24, as illustrated in FIG. 1 where the photocells are spaced around the periphery of the shaft, may actually be restricted to a single photocell array having a limited area. This is shown in FIG. 3A as photocell array 24'. In addition to the lighter shaft weight provided by the limited area array, a single light source 32' (for example, a flood light of 150 watts) may be used to illuminate the photocell array to provide power for the associated rotating electronics. All that is necessary is that the light source provide an arc (or sector) 91 of illumination which is substantially equivalent to the circumferential extent of the arcuate receiver 31, which is designated by the arrows 92. In other words, as shown by the direction of rotation, arrow 93, and the various light rays 94 from light source 32', the photocell array 24 must be activated by a light ray, somewhat in advance of the data function of the phototransistors of the arcuate receiver 31. This provides sufficient circuit settling time prior to storage of data in shift register 46 (see FIG. 9B). Typical effective dimensions for sector 91 might be 20° with the extent of the arcuate section 92 being perhaps 5 degrees less. The dimensions have been exaggerated for clarity in FIG. 3A. Naturally light source 32' could be enclosed in an explosion proof enclosure (when hazardous conditions exist).

FIG. 6A illustrates another alternative embodiment of the invention where the stationary light assembly 16' includes an additional phototransistors 42'a and 42'b for data and data sync and additional light emitting diodes 41'a for start and 41'b send to compensate for axial changes of the rotating shaft and system 14. Specifically, changes in thermal growth, thrust position and magnetic center may cause a shift in the axial direction (with reference to axis 30 see FIG. 1) as much as 0.500 inches. To accomodate such shift, the phototransistors and LED for each data bit are multiplied with adjacent units, as illustrated in FIG. 6A in the case of stationary light assembly 16'. These adjacent units of course are located in an axial direction. Preferably there are two additional units, either phototransistors or light emitting diodes, whatever is the case adjacent to the original. As illustrated in the alternative embodiment of FIG. 9C, the phototransistors 42'a and 42'b are logically ORed so that if, for example one of the rotating LEDs, either data 28a or data sync 28b, is axially moved, as indicated in FIG. 9C by the dashed figures adjacent phototransistor will still receive the bit of transmitted data. Light emitting diodes 41'a and 41'b are always "on" and therefore in a logical AND configuration.

Finally, as illustrated in FIG. 6A, the typical axial motion might be as much as 0.500 inches which can be accomodated by the extra pair of phototransistors, for example, 42'a. Naturally, the spacing of the rotating elements 28a, etc., are far enough apart so as not to interfere with adjacent phototransistor or LED components. To provide for reverse rotation, reverse start LEDs 40 are provided on stationary light assembly 16'.

Thus, an improved wireless data coupling system for transmitting data from a rotating shaft to a stationary receiver has been provided.

We claim:

1. A wireless data coupling system for transmitting data from a rotating shaft to a stationary receiver comprising:
   means included in said stationary receiver for generating a start signal and at least one send signal;
   register means mounted on said shaft for storing said data as a string of binary digits;
   first light receiving means mounted on said shaft for receiving said start signal from said stationary receiver for loading said register with said binary digits;
   second light receiving means mounted on said shaft adjacent said first light receiving means for receiving only at least one send signal from said means for generating said send signal;
   and at least a pair of light transmitting means mounted on said shaft responsive to said at least one send signal for transmitting to said receiver said binary digits stored in said register along with at least one sync signal corresponding to said at least one send signal.

2. A system as in claim 1 where said receiver includes an arcuate sequence of phototransistors for receiving said binary digits with a radius perpendicular to the axis of said shaft, said light transmitting means including a single light emitting diode for transmitting said binary digits.

3. A system as in claim 1 where said first and second receiving means and said light transmitting means mounted on said shaft include a collar fastened to said shaft with an interior U-shaped slot with the bite of the U facing said shaft and being coaxial with the axis of said shaft and including a flexible printed circuit board mounted against said bite with circuit components mounted on the side facing the shaft whereby centrifugal forces occurring during rotation of said shaft bias said components against said printed circuit and bias said printed circuit against said bite.

4. A system as in claim 1 where said stationary receiver means includes an arcuate sequence of phototransistors, with a radius perpendicular to the axis of said shaft, for receiving said binary digits and where said light transmitting means mounted on said shaft includes a light emitting diode for transmitting said binary digits and where said plurality of arcuate phototransistors is responsive to a said transmitted binary digit as said shaft rotates said light emitting diode mounted on said shaft opposite each one of the sequence of phototransistors, each said one of said phototransistors including at one additional phototransistor adjacent to it in a direction parallel to said axis and logically ORed with said adjacent phototransistor whereby axial movement of said shaft is compensated for.

5. A system as in claim 2 where said plurality of arcuate phototransistors is responsive to a said transmitted binary digit as said shaft rotates said light emitting diode mounted on said shaft opposite each one of the sequence of phototransistors.

6. A wireless data coupling method for transmitting data from a rotating source to a stationary receiver comprising the following steps:
   generating and transmitting from said stationary receiver to said rotating source a start signal to cause said rotating source to store in binary digital format said data to be transmitted;
   transmitting from said stationary receiver to a single light receiver mounted on the periphery of said shaft of said rotating source a sequence in time of send signals for each bit of said stored data to be received;
   in response to said sequence of send signals transmitting from said rotating source a corresponding sequence of said binary digital data signals which have been stored; and
   receiving said transmitted data signals and converting said signals to displayable information.

7. A method as in claim 6 including the step of producing at said rotating source a sequence of data sync pulses corresponding to said sequence of said send signals and transmitting to said stationary receiver said sync pulses along with each binary digit transmitted.

8. A method as in claim 7 including the step of using the first received of said data sync pulses as indicative of revolutions per minute of said rotating source.

9. A method as in claim 7 including the step of using the last received data sync pulse as indicative of the last bit of said transmitted data.

10. A wireless data coupling system for transmitting data from a rotating shaft to a stationary receiver where a parameter of said shaft is being measured comprising:
   said receiver including an arcuate sequence of phototransistors for receiving digits with a radius perpendicular to the axis of said shaft;
   a photocell means having a limited area and located on only a relatively small portion of the circumference of said shaft compared to a full circle for receiving light energy for powering electric components mounted on said shaft;
   a light source means in close proximity to said photocell means for illuminating and providing said light energy to said photocell means once each revolution, said light source means providing a sector of illumination of said shaft substantially equivalent to at least the circumferential extent of said arcuate receiver but substantially less than a full circle;

means mounted on said shaft including said electric components and powered by said photocell means for converting a measured analog signal parameter to a signal having a plurality of binary digits and transmitting digits of said signal to said arcuate stationary receiver during said illumination of said photocell means.

11. A system as in claim 10 where said means for transmitting digits to said stationary receiver is mounted on said shaft substantially diametrically opposite said photocell means.

12. A wireless data coupling system for transmitting data from a rotating shaft to a stationary receiver comprising:

means included in said stationary receiver for generating a start signal and at least one send signal, said start and send signal means being angularly displaced with reference to the direction of rotation of said shaft;

register means on said shaft for storing said data as a string of binary digits;

first light receiving means mounted on the periphery of said shaft for receiving said start signal from said stationary receiver for loading said register with said binary digits;

second light receiving means mounted on the periphery of said shaft and axially aligned with said first light receiving means for receiving said at least one send signal; and light transmitting means mounted on said shaft responsive to said at least one send signal for transmitting to said receiver said binary digits stored in said register.

* * * * *